United States Patent [19]
Dahlberg et al.

[11] 3,790,362
[45] Feb. 5, 1974

[54] DIRECTIONAL CONTROL FOR THERMAL SEVERING OF GLASS

[75] Inventors: John R. Dahlberg, Jeannette; James L. Oravitz, Cheswick; Edmund R. Michalik, West Mifflin, all of Pa.

[73] Assignee: PPG Industries, Inc., Pittsburgh, Pa.

[22] Filed: June 21, 1972

[21] Appl. No.: 265,082

Related U.S. Application Data

[62] Division of Ser. No. 72,353, Sept. 15, 1970, Pat. No. 3,709,414.

[52] U.S. Cl............................ 65/174, 65/112, 225/2, 225/93.5
[51] Int. Cl............................................ C03b 33/02
[58] Field of Search..... 65/112, 113, 174, 175, 176, 65/103; 225/2, 93.5

[56] References Cited
UNITED STATES PATENTS
3,695,497  10/1972  Dear........................................ 225/2
3,372,015  3/1968  Richardson............................ 65/103

Primary Examiner—Arthur D. Kellogg
Attorney, Agent, or Firm—Thomas F. Shanahan

[57] ABSTRACT

This invention relates to non-contact thermal severing of glass and includes methods and apparatus for altering at least some of the radiation from a thermal source so that a temperature profile that would ordinarily otherwise tend to be asymmetrical becomes symmetrical about an intended path of cut. The problem of asymmetrical temperature profiles occurs, for example, in non-bisecting cuts. The cut is completed either by continuing with the application of radiant heat until a tensile stress of about 1,000 pounds per square inch is generated within the glass, or by applying a bending moment about the thermal score.

7 Claims, 8 Drawing Figures

PATENTED FEB 5 1974 3,790,362
SHEET 1 OF 3

DIRECTIONAL CONTROL FOR THERMAL SEVERING OF GLASS

This is a division of application Ser. No. 72,353, filed Sept. 15, 1970 now U.S. Pat. No. 3,709,414.

BACKGROUND OF THE INVENTION

1. Field of the Invention

This invention relates to methods of and apparatus for directing non-bisecting thermal cuts and scores on a piece of glass.

2. Description of the Prior Art

The most pertinent prior art of which we are aware comprises Campbell et al., U.S. Pat. No. 1,720,883; Hitner, U.S. Pat. No. 1,777,644; Spinasse, U.S. Pat. No. 1,973,546; Kovacik et al., U.S. Pat. No. 3,344,968; and Hafner, U.S. Pat. No. 3,453,097.

The Campbell et al. patent discloses, for example, the severing of glass in accordance with a method comprising "bringing a hot object or objects or elements, heated electrically or otherwise, into contact with or into close proximity of the glass." It discloses, moreover, that: "In order to quickly initiate the severing action, a nick or fault or other weakened portion may be formed by the apparatus at a point on the glass at the line of cleavage where the severage action is to start."

The Hitner patent discloses, for example, "an improved apparatus adapted to prevent the somewhat irregular line of fracture which has hitherto been characteristic of the severing of glass by the use of an electrically heated wire or ribbon." The Hitner patent uses an electrically heated wire for the non-contact severing of glass, but it teaches "providing means for giving a distribution of heat over a substantial area of glass on each side of the ribbon or wire," saying that, "as a result, the line of fracture is smooth and regular, approximating in these particulars the line of fracture secured by scoring the glass with a diamond or wheel."

The Spinasse patent teaches, for example, having "a tubular portion of metal or other suitable refractory material adapted to present a heating surface in close contact with or in close proximity to the body of the drawing sheet near the region where the same is to be cut to remove the border." It teaches further: "It will be obvious, therefore, that as the sheet of glass is drawn past the heating element the border of the glass is heated in a path parallel to and near the edge of the sheets so that if the glass could be cut or checked by means of a cold checking tool beyond the heated path, shown by the broken line in FIG. 2, the border can be easily removed without fracturing the body of the sheet." The patent further teaches that the "temperature of the heating element can be varied according to the thickness of the glass or the speed at which it is drawn past the heater but as a rule a cherry-red heat yields good results for the average sheet at the average speed of drawing."

Kovacik et al. disclose, for example, "A plurality of spaced score lines 20 to 23 are made on one surface of the sheet inwardly of each longitudinal edge and thereafter the portions A, B and C are respectively or successively removed to redistribute the stresses within the glass sheet. The final cut is then made by locating the gauging bar a distance of one-half the width of the heating apparatus from the predetermined line of cut 23 and thereafter aligning the heating apparatus against one surface of the gauging bar to locate the electrical resistance element on the score line 23. Heat is supplied a sufficient period of time to allow the cut to run the entire length of the sheet."

The Hafner patent discloses, for example, a method of cutting glass "wherein the glass sheet is moved continuously past a continuous laser beam which is focused upon the glass sheet. The laser and absorptive characteristics and parameters are selected so that the glass absorbs the laser energy and converts it into sufficient heat to enable separation of the sheet into pieces along the line swept by the laser beam."

SUMMARY OF THE INVENTION

Non-contact thermal serving is conducted by using a focused source of infrared energy having suitable power and delineation characteristics. The methods, as described in U.S. Pat. application Ser. No. 66,940 filed Aug. 26, 1970, now U.S. Pat. No. 3,695,497 and U.S. Pat. application Ser. No. 66,941 filed Aug. 26, 1970, now U.S. Pat. No. 3,695,498 (both of said applications being assigned to applicants' assignee) yield pieces of glass having edges of high quality, particularly in regard to their strength. The present invention is an improvement over the inventions of the above-mentioned applications, in that methods and apparatus have now been discovered which produce thermally severed edges that are straight and follow the intended path of cut, even in non-bisecting cuts.

The above-mentioned applications recognize the fact that it is very difficult to apply thermal severing of glass to production applications because of the inability of the methods described to produce straight non-bisecting cuts. This problem arises regardless of the type of thermal energy source or mode of application. Cross-cuts and bisecting cuts are always straight (i.e., they always follow the intended path of cut). Non-bisecting cuts are always bowed (hereafter referred to as "banana edge") with the bow extending into the narrower piece of glass. We now believe that the theory of the development of the fracture in glass from the application of heat and the propagation of that fracture is understood. Normally, the glass surfaces are under a compressive stress and the central region is under a tensile stress. As the glass is heated, the compressive stresses on the surface decrease and the tensile stresses at the center increase. When the tensile stresses are increased to a value of at least 1,000 pounds per square inch (725 grams per square millimeter), the glass will fracture. If the infrared source is removed before the stresses build up to 1,000 pounds per square inch, a bending moment can be applied about the heat path or thermal score to sever the glass at the heat path. In non-bisecting cuts, there has hitherto been a problem in trying to make the glass fracture along the intended path of cut. Basic thermal severing, as described in the above-mentioned applications, produce excellent results both in cross-cuts transversely of a moving ribbon and in bisecting cuts. Our recent tests indicate that on cross-cuts and bisecting thermal cuts, the glass temperature profile about the heated path is symmetrical, but on non-bisecting cuts the glass temperature profile about the intended path is not symmetrical. In the non-bisecting cuts, the temperature of points on the surface of the trim side of the intended path of cut is higher than similarly located points on the other side of the line. The temperature profile is slightly tilted. Thus, since the stresses in the glass are directly related to the temperature that creates the stresses, the fracture runs towards the hotter side, and a banana edge is produced.

It is an object of this invention to create a symmetrical temperature profile in a piece of glass along an intended path of cut by:
- providing a source of thermal energy adjacent to said intended path,
- irradiating said glass in the vicinity of said intended path by activating said source so that it emits radiation toward said glass, the latter thereby tending to develop a temperature profile that is asymmetrical relative to said intended path, and
- altering either the direction or the intensity of at least some of said radiation from said source to balance said temperature profile about said intended path so that said profile becomes symmetrical.

To explain the invention in its broadest and most generic aspect, the glass is heated by a radiant source along an intended path of cut while at least some of the radiation from the source is altered so that the temperature profile that is created in the glass is symmetrical. One can either continue to heat the glass in such a manner until a tensile stress of at least about 1,000 pounds per square inch is created within the glass, or one can apply a bending moment about the intended path of cut before the tensile stresses reach 1,000 pounds per square inch. The first method can be thought of as a heat-plus-heat method (thermal cutting) and the second method can be thought of as a heat-plus-bending method (thermal scoring with mechanical snapping).

It is an object of this invention to modify the temperature profile in non-bisecting thermal severing of glass so that the temperature profile about the heat path is symmetrical and the resultant non-bisecting cut follows the intended path.

As used in this application, the term "thermal severing" is generic and includes both thermal-cutting (increasing tensile stresses to above 1,000 pounds per square inch, or 725 grams per square millimeter) and thermal-scoring with mechanical snapping. The terms, "thermal score" and "thermal scoring," as used in this application, do not mean a scratch or a groove in a glass surface, but rather a condition brought about by heat, wherein stresses are created within a localized and substantially linear region of the glass.

It has been discovered that when means are employed which are capable of producing a symmetrical temperature profile about a non-bisecting intended path, a straight cut (i.e., a cut that follows the intended path, usually a rectilinear one) will be produced. In order that any directional control method be successful, it must satisfy the physical condition of temperature symmetry about the intended path of the cut.

It is an object of the present invention to limit the intensity of heating on the trim side of the glass. A preferred means for carrying out this object is a shield positioned between an infrared line heater and the glass on the trim side. The proximity of the edge of the shield to the cut line on the glass controls the degree of heating on the trim side of a glass. This in effect is steering the fracture by producing a symmetrical temperature profile about the non-bisecting, intended path of the cut.

It is also an object of the present invention to modify the shape of the shield along its length to eliminate any end effects. In a preferred embodiment, the shield is curved along its length to keep the temperature profile symmetrical.

There are four basic modes of thermal cutting: static self-propagation, dynamic self-propagation, static thermal score and mechanical snap, and dynamic thermal score and mechanical snap. In static self-propagation, an infrared focused line heater of a given length is positioned under, over, or under and over the intended path or line of cut of a piece of glass of fixed length. In dynamic self-propagation, an infrared source is positioned under, over, or under and over the intended path of line of cut and there is relative movement between the spot source and the glass. In static thermal score and mechanical snap, an infrared focused line heater of a given length is positioned under or over the intended path or line of cut of the piece of glass of fixed length. In dynamic thermal score and mechanical snap, an infrared source is positioned under or over the intended path or line of cut and there is relative movement between the spot source and the glass. The methods and apparatus of the present invention may be used in conjunction with all four modes of thermal cutting. Also, these methods may be used with other thermal sources. In addition, the methods may be altered so that instead of shielding the trim side, it may be cooled by cooled air or the like. Further, this invention comprehends in a broad aspect thereof the possibility of heating the glass on the side opposite the trim, instead of or in addition to the cooling of the trim side. Finally, it would appear possible to modify a reflector so that it does not reflect all of the radiation supplied to it by a thermal source. This could be carried out by using a non-reflective material on portions of the internal surface of the reflector or by providing holes in the reflector. One could thus alter the intensity of radiation supplied at various points of the glass surface and therefore control the temperature distribution within the surface of the glass.

Test results indicate that where a fixed input energy-level is used, cutting times must be increased for static cutting and cutting speeds must be decreased for dynamic cutting when heat shields are used. For example, when cutting 2 inch by 24 inch trims from ¾ inch by 14 inch by 24 inch glass using a 25-inch-long infrared line heater, the cutting time without a shield is about 14 seconds and the cutting time with the shield spaced one-sixteenth of an inch from the cut line is about 19 seconds. However, there is a clear benefit in that the five-sixteenths of an inch bow in the unshielded cut is completely eliminated when a suitable shield is used.

The methods and apparatus of the present invention can be used on plate glass, float glass, sheet glass, and low-expansion glass, with edges being produced, in each instance, that are straight, smooth, strong and perpendicular to the surfaces of the glass.

The methods and apparatus of the present invention yield reliably cut pieces of glass having edges of high quality, particularly in regard to their strength. Though possibly of some use with glass as thin as 0.04 inch (1 millimeter) in thickness, the method and apparatus of the present invention are of particular usefulness in the cutting of thick flat glass, such as over 0.25 inch (6.35 millimeters) in thickness. While non-contact thermal severing of glass sheets with a shield has considerable commercial advantages with reference to sheets of glass having a thickness of 0.25 inch (6.35 millimeters) or more, the present invention may be used with respect to glass sheets having a thickness of 0.04 inch (1 millimeter) to 2 inches (51 millimeters) and possibly thicker.

The present invention is of great importance in connection with the severing of sheets that are greater than 0.25 inch (6.35 millimeters) in thickness because when mechanical scoring means have been used in connection with the above, there has hitherto been difficulty in obtaining a cut edge of satisfactory appearance, high edge strength, and other desirable characteristics. It has been particularly difficult to obtain, in cutting a piece of glass that thick, an edge that is suitable for further use without a further grinding or polishing operation. Moreover, the strength of the cut edge produced by prior-art methods such as hand scoring and mechanical snapping does not usually exceed about 4,000 pounds per square inch (2,900 grams per square millimeter) and is frequently considerably less than that, whereas it is frequently desired that, especially without such grinding and polishing, the cut edges exhibit better edge-strength values. Thermal severing, as described in the above-mentioned applications, provides a solution, but in many instances not a practical one, since non-bisecting cuts do not follow the intended path. The application of a heat shield in thermal severing, as taught herein, to make the temperature solution symmetrical, is a practical s/lution.

The edges produced by the non-contact thermal-severing methods with heat shields, as taught herein, have a pristine appearance and high strength.

The present invention is similar to those of the above-mentioned applications in certain salient aspects. First, in the present invention, the source used is preferably one that has satisfactory delineation and potency. Second, it is preferable that there be a suitable elliptical heat-reflecting means in operative association with the thermal source. Lastly, when an elliptical heat-reflecting means is used, the thermal source is positioned at one of the foci of the ellipse, with the intended line of cut being positioning at the other focus of the ellipse. As in the case of thermal severing without a shield, thermal severing with a shield produces edge strengths that are at least about twice those of pieces of glass cut in accordance with the prior-art method of hand-scoring and mechanical snapping. The increase in edge strength is not merely of academic interest, since the edge strength is related to the observed incidence of breakage during any subsequent handling of the edge-cut sheet of glass involved.

DESCRIPTION OF THE DRAWINGS

A complete understanding of the invention may be obtained from the foregoing and following description thereof taken in conjunction with the appended drawings, which are diagrammatic and not to scale unless noted, and in which.

DESCRIPTION OF THE PREFERRED EMBODIMENT

Figure 1:
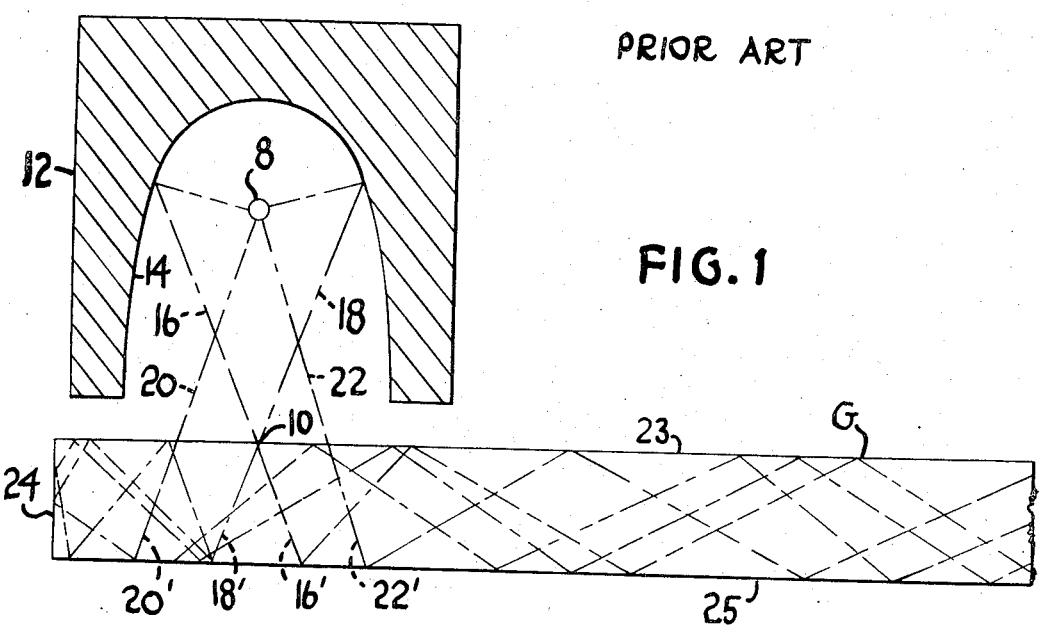
FIG. 1 is a schematic elevation view of prior-art apparatus used to sever thermally a piece of glass without a heat shield.

Referring to FIG. 1, there is shown a piece of glass G in position to be thermally severed. The drawing shows schematically a source 8 of thermal energy, preferably one that has a substantial output of radiation in the range of 8,500 to 11,500 Angstroms wave length, and necessarily one that is capable of producing at the spot or locus 10 electromagnetic thermal radiation such that the heat applied produces a stress in tension within the thickness of the glass. Source 8 can be a spot source or a line source. When self-propagating cuts are desired (cuts made by heat alone), it is necessary to create a tensional stress of at least about 1,000 pounds per square inch (725 grams per square millimeter). Where one wishes merely to create a thermal score, the stresses will not be that high. A detailed description of the apparatus shown in FIG. 1 is contained in the above-mentioned patent applications Ser. No. 66,940, filed Aug. 26, 1970, and Ser. No. 66,941, filed Aug. 26, 1970. Briefly, there is shown a hood 12 that has, interiorly thereof, a highly polished and reflective elliptically shaped surface 14. As can be seen from FIG. 1, the surface 14 is such that most of the radiation emanating from the source 8, as indicated by lines 16 and 18, is reflected and focused at the focus locus 10. To obtain this result, it is essential that source 8 be located substantially at one of the foci of the ellipse that is generated by completing the surface 14, with the focus locus 10 forming the other focus of said ellipse. In the event that the source 8 is considered as constituting only a spot, the surface 14 constitutes a frustrum of an ellipsoid of appropriate shape. If the source 8 comprises a line, the shape of the reflecting surface 14 is such that in proceeding along that line and taking any of the planes passing through that line and perpendicular to it, the intersection of that plane with the surface 14 is such as to define an ellipse having one focus at 8 and another focus at 10 with the focus at 10 being aligned with the surface of the sheet of glass G to be cut. Some of the radiation emanating from the source 8, as indicated by lines 20 and 22, goes directly to surface 23 of the glass G.

It is important to note that radiation (reflected and direct) emanating from source 8 enters the glass G and is reflected within the glass G, as indicated by 16', 18', 20', and 22' in FIG. 1. Any radiation entering the glass and traveling toward the right does not immediately see an edge (such as 24) and is reflected freely toward the right, as indicated at 16' and 22'. Any radiation that enters glass G toward the left in FIG. 1 (the trim side) will be reflected as indicated at 18' and 20'. Radiation traveling toward the left (the trim side) is immediately exposed to more surface area (due to the presence of trim edge 24) and it is therefore reflected more often than radiation passing toward the right side, since the radiation traveling toward the right side has a greater distance to travel before it experiences an edge (not shown). Therefore, since the radiation on the trim side is more restricted (i.e., the trim portion traps the radiation internally, since there are internal reflections off edge face 24 in addition to surfaces 23 and 25) than the radiation on the other side, the trim side gets hotter than the other side, causing a "banana edge" to be created.

Figure 8:
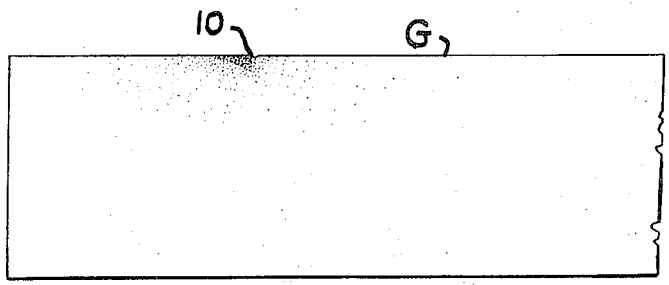
FIG. 8 is a schematic elevation of the glass in FIG. 1, illustrating the non-symmetrical temperature profile.

Referring to FIG. 8, there is shown a diagram illustrating how the intensity of the heat within the glass thickness varies. Dots have been used to show temperature, and the areas where the dots are more intense indicate the areas where the heat is more intense. Note that the trim side is hotter than the other side.

Figure 3:
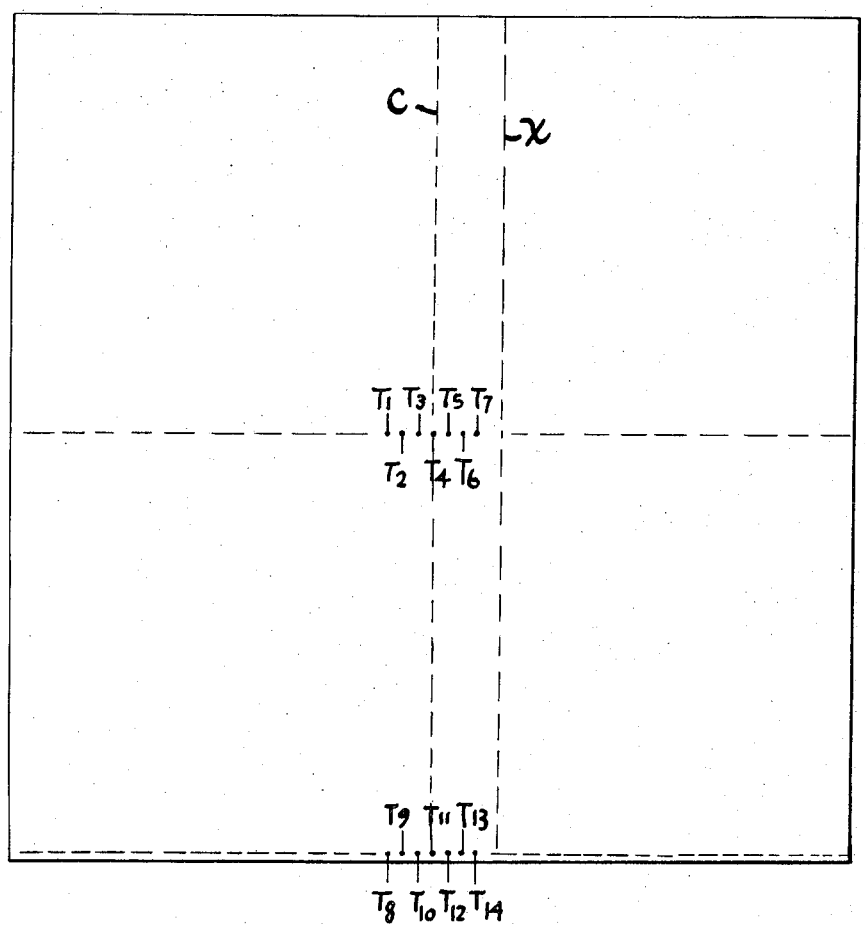
FIG. 3 is a plan view drawn to scale of a sheet of glass, showing a thermocouple arrangement used to test temperature-profile symmetry.

Referring to FIG. 3, there is shown a diagram of a piece of plate glass 24 inches by 24 inches by ¾ inch with seven thermocouples $T_1 - T_7$ (spaced one-fourth inch apart, one from another) placed along the center of the plate and 7 thermocouples $T_8 - T_{14}$ (spaced the same way) placed 1½ inches from a bottom edge. FIG. 3 shows the thermocouple layout in scale. Tests were conducted using a 25-inch-long, line-type heater and heating the plate for 16 or 17 seconds along the center line C through the thermocouple $T_4$ and $T_{11}$. Then, after the thermal score was completed for the bisecting cut, a 10-inch piece was trimmed from the right side of the test piece along dotted line X, so that the set-up simulated the condition of thermally scoring a 2-inch trim (non-bisecting cut) at the center line with the same thermocouples as sensors as in the bisecting thermal score. Temperatures were recorded at various times after the heating ended. Using the bisecting-score data as a reference, the following was noted for the non-bisecting score: $T_4$ increased approximately 12°F; $T_5 - T_3$ was approximately 8°F; $T_6 - T_2$ was approximately 3°F; and $T_7 - T_1$ was approximately 3°F. This indicates how the trim side is hotter than the other side for non-bisecting thermal scores. When tests were conducted using thermocouples $T_8$ to $T_{14}$ at the bottom edge of the glass, it was discovered that the temperature profile remained symmetrical, even when the 10-inch portion was removed. This is because the thermocouples were only 1½ inches from the bottom edge, and they were all subject to a similar edge effect for the bottom edge.

Figure 2:
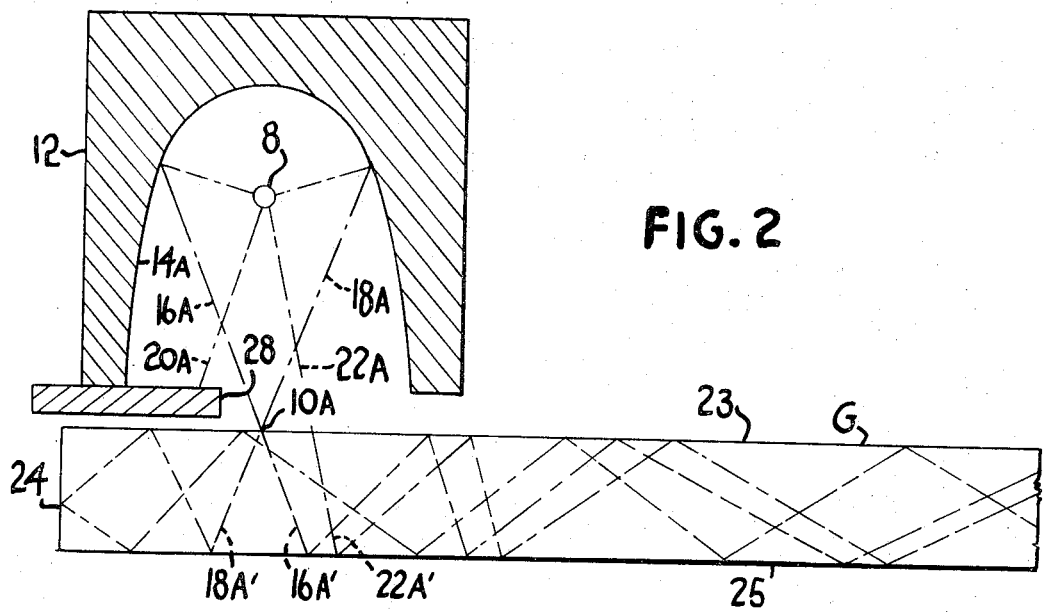
FIG. 2 is a schematic elevation view of the apparatus used in practicing the methods of the instant invention, i.e., apparatus for thermally severing glass with a heat shield.

Referring to FIG. 2, there is shown an apparatus that is identical to that of FIG. 1 except for the addition of a thermal shield 26, which alters the path of some of the radiation from source 8 and therefore prevents some of the radiation from traveling into the trim side of the glass. This makes the trim side relatively cooler but results in a temperature profile that is symmetrical about the intended path of cut. Note that the reflected radiation within the glass, as indicated by 16A', 18A', and 22A', is similar to the reflected radiation in FIG. 1; 16', 18', 20', and 22'. The difference is that shield 26 in FIG. 2 prevents some of the radiation from reaching the glass, as is indicated at 20A. By controlling the position and dimensions of the shield 26, it is possible to control the extent or degree of temperature reduction of the trim side.

The shield 26 may be made of any material that is opaque to infrared radiation. Preferred materials include aluminum and stainless steel, either alone or when coated with a high temperature insulator such as an aluminum-silicate fiber material. Typical aluminum-silicate fibers are "Fiberfrax" manufactured by The Carborundum Company or "Kaowool" manufactured by The Babcock & Wilcox Company.

In order for the cut to be straight, careful attention should be paid to the location of the shield. The shield position and shape of the shield 26 must be carefully selected in accordance with the width of the trim, the thickness of the piece of glass, the length of the intended path of cut and the power output of the source 8.

The following example illustrates the effect of varying the trim width: When a trim 6 inches by 34 inches is removed from a piece of ¼-inch float glass, i.e., 34 inches by 32 inches, using a 50-inch line heater and a heat shield of aluminum bar stock 0.126 inch thick, to eliminate the "banana edge" the heat shield is placed one-eighth of an inch from the intended line of cut. When the trim is reduced to 2 inches by 34 inches, the heat shield must be moved one-sixteenth of an inch toward the intended line of cut. This is logical if one considers that in removing the narrower trim, the edge 24 is closer to the focus locus 10, therefore creating more of a temperature profile unbalance, which requires more shielding.

Proper thermal-shield position is also dependent on the thickness of the glass to be cut. For pieces of glass of differing thicknesses, the shield is preferably moved closer to the intended cut line as the thicknesses increase. This is because the amount of internal absorption increases with the glass thickness. Normally, with ¼-inch-thick glass, 80 percent of the radiation goes right through the glass, 10 percent is absorbed at the surface, and 10 percent is absorbed through the thickness. With thicker glass, the figures change, and some of the 80 percent that would pass through ¼-inch glass is absorbed.

Figure 4:
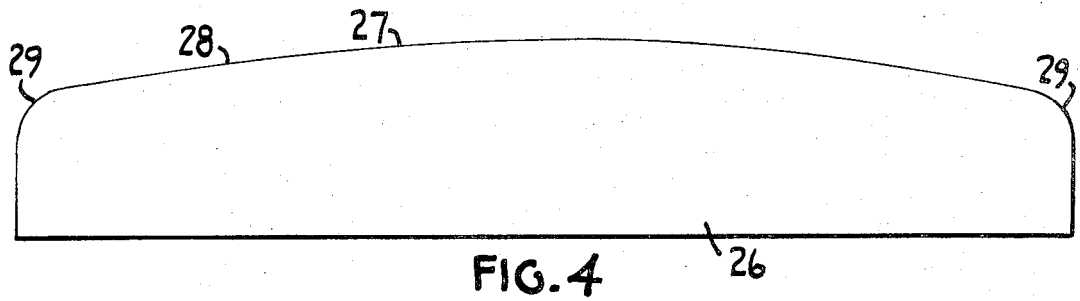
FIG. 4 is a plan view of a preferred heat shield.

Variations in the length of the trim have no effect on the preferred position of the shield 26 with respect to the intended line of cut, but may influence the preferred thermal shield. FIG. 4 shows a thermal shield 26. Edge 28 is the edge adjacent to the intended line of cut. Note that edge 28 is not straight, but is a large-diameter curve at midsection 27, falling off sharply at ends 29, which ends extend for about 2 to 3 inches. Preferably, the shield is shaped so that the edge 28 is twice as far from the intended cut line at the ends as at the center line.

Figure 5:
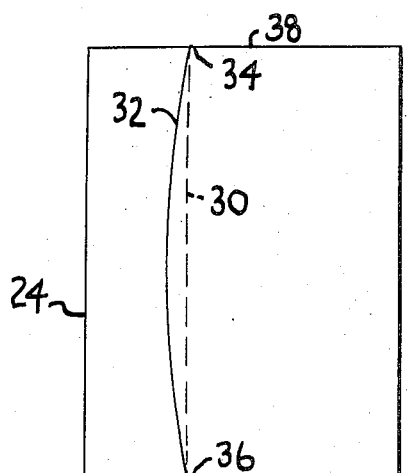
FIG. 5 is a plan view of a sheet of glass, showing the edge that is obtained when the heat shield is omitted.

FIG. 5 is a diagram of a sheet of glass G with the broken line 30 indicating the intended line of cut. When thermal severing methods are used but without a thermal shield, as described in the above-mentioned patent applications, the resulting edge does not follow intended path 30 but rather follows something like the "banana edge" indicated at 32. The ends 34 and 36 of the "banana edge" 32 coincide with intended path 30. This is because of the effects of edges 38 and 40. It is the edge 24 that creates the non-symmetrical temperature profile which causes the "banana edge" 32. Adjacent to the ends 38 and 40 in FIG. 5, the temperature profile about the cut line becomes symmetrical because of their presence, and the cut therefore follows the intended path.

Figure 6:
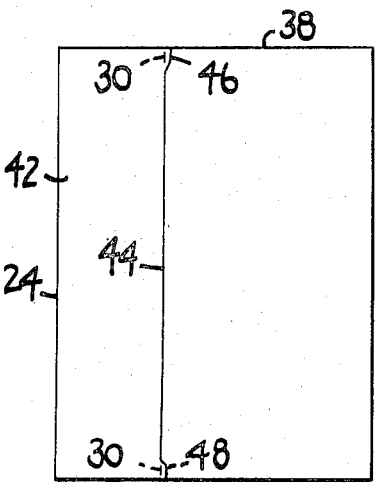
FIG. 6 is a plan view of a sheet of glass, showing the edge that is obtained with a straight-edged thermal shield is used.

If the surface 28 of the thermal shield 26 in FIG. 4 was straight instead of curved as shown, an edge such as that illustrated in FIG. 6 would result. Referring to FIG. 6, there is shown a trim 42 with an edge 44 that results when a thermal shield with a straight edge is used rather than a curved edge 28 as shown in FIG. 4.

This is caused by the fact that the thermal shield eliminates or balances the effect of edge 24, and now the ends 46 and 48 of edge 44 in FIG. 6 move away from edge 24 because of the effect of edges 38 and 40. By making edge 28 curve as shown in FIG. 4, one can produce a trim edge that is straight and follows the intended cut line.

Figure 7:
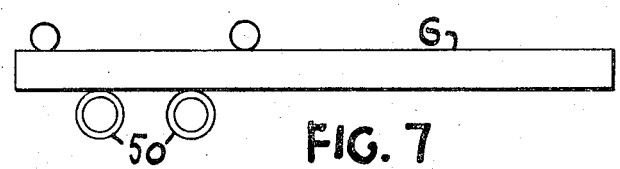
FIG. 7 is a schematic elevation view, indicating the practice of applying a bending moment at the thermal score.

As pointed out in the above-mentioned patent applications, it is important that an edge nick be applied to an edge of the glass surface along the intended line of cut. In the case of thermal cutting, i.e., cutting by heat alone, the edge nick should be applied before the heat is applied. In the case of thermal scoring and mechanical snapping, the edge nick may be applied either before or immediately after the thermal source applies the thermal score to the surface of the glass. Referring to FIG. 7, a bending moment is applied to the sheet of glass G around a thermal score or heat path after the ¼-inch-long edge nick has been made. Obviously, the bending moment is not necessary for self-propagating cuts. In FIG. 7, snap rolls are illustrated diagrammatically at 50, but actually any conventional snapping means may be used.

The application of the bending moment must be about the thermal score, which must pass through the edge nick for a high-quality edge to result. If the edge nick is omitted, of if the bending moment is not applied about the thermal score (in a thermal score, mechanical snap method), the resulting edges may have defects such as lack of smoothness, lack of adequate edge strength, lack of straightness, and lack of perpendicularity to the glass surfaces.

We claim:
1. Apparatus for creating a substantially symmetrical temperature profile in a piece of glass about a non-bisecting, intended path of cut comprising:
  a source of thermal energy for heating said glass along said intended path of cut and creating a temperature profile about said path, and
  shield means for contemporaneously shielding the narrow side of said non-bisecting path of cut from thermal energy produced by said source, said shield means having an edge portion which extends toward said path of cut with a contour such that a substantially symmetrical temperature profile is established about the path of cut.
2. Apparatus according to claim 1 wherein said source produces thermal radiation and includes an elliptical reflector means for focusing said radiation on said intended path.
3. Apparatus according to claim 2 wherein said shield means is a heat shield that is opaque to infrared radiation.
4. Apparatus according to claim 1 wherein said shield means is a heat shield that is opaque to infrared radiation.
5. Apparatus according to claim 4 wherein said heat shield has a curved edge adjacent said intended path.
6. Apparatus according to claim 4 wherein said heat shield is made of aluminum.
7. Apparatus according to claim 4 wherein said heat shield is made of stainless steel.

* * * * *